Patented Mar. 19, 1946

2,396,651

UNITED STATES PATENT OFFICE 2,396,651

ART OF SEPARATING CONSTITUENTS OF TALL OIL

Torsten Hasselstrom, Savannah, Ga.

No Drawing. Application December 23, 1943, Serial No. 515,467

13 Claims. (Cl. 260—97.5)

This invention relates to the separation of the constituents of tall oil through a process of selective esterification and disproportionation.

Tall oil is a product obtained from the pulp industry, in which the acid treatment of pine wood has occasioned the separation of rosin from fibers. In the crude state, it is a more or less viscous, dark-colored, malodorous substance which contains resin acids, fatty acids, and unsaponifiables. Illustratively, a crude tall oil contains 40 to 45 percent of fatty acids, 47 to 55 percent of resin acids, 5 to 8 percent of unsaponifiables, and up to, say, one percent of water; along with, for example, 0.08 percent of sulphur including mercaptan sulphur which confers odor upon the material. It has been proposed to purify and refine tall oil in various ways, such as by distillation; but the distilled semi-refined, or refined tall oil still comprises a mixture of the substances above specified, and also has a relatively high degree of unsaturation so that it tends to oxidize. Thus, a distilled tall oil may illustratively contain around 80 percent of fatty acids, 18 percent of resin acids, and 2 percent of unsaponifiables in the first fraction: and later fractions of the distillation contain increasing quantities up to 35 percent of resin acids, with illustratively 60 percent of fatty acids and 5 percent of unsaponifiables: while the still residue contains largely resin acid and unsaponifiables. The distilled tall oil may contain 0.06 percent of sulphur, and refined tall oil as much as 0.09 percent of sulphur.

Due to the odor, color, and unsaturation of crude, refined and distilled tall oils, they have not been directly employable for many purposes. However, the resin and fatty acids of tall oil are valuable, and it is desirable to employ them in industry.

Resin acids of the abietic type occur in tall oil, and have the empirical formula $C_{20}H_{30}O_2$, and are unstable to oxidation and other influences leading to addition to the molecule. However, in prior applications and patents, this applicant and his coworkers have described manners of effecting disproportionation of such abietic-type resin acids to yield a product which contains resin acids of the empirical formulas $C_{20}H_{28}O_2$ and $C_{20}H_{32}O_2$, known respectively as dehydroabietic or $H_{28}$ acid and as dihydroabietic or $H_{32}$ acid.

It has been found that the tall oil in crude, semi-refined, or refined condition can be given a selective separation by esterification, followed by disproportionation, in which the concatenation of the steps leads to an improved and clean-cut segregation of valuable components, together with recycling fractions for increasing the overall yield.

Example I

A crude tall oil 1 having an acid number of 160 to 165 and containing not exceeding 1 percent of water was dried by heating to about 135 to 150 degrees C. To the dried substance was added 15 percent by weight of methanol and 2 percent by weight of concentrated (1.84) sulphuric acid. The mixture was refluxed for 1½ hours, during which time the reaction was completed. The acid number of the product was 90. The excess of methanol was then distilled off: about 65 percent of the original methanol was thus recovered. The residue consisted of selectively esterified tall oil, and was heated to a temperature of about 185 degrees C. and 0.6 percent of iodine was introduced. During the addition of the iodine, a slight temperature rise was noted, accompanied by frothing. The mixture was then held for one hour at a temperature between 190 and 230 degrees C.

The substance was then allowed to cool and stand from 1 to 2 hours. Crystallization occurs, with the development of cleaner crystals and somewhat larger yield by reason of the disproportionation and esterification, as compared with the omission of either esterification or disproportionation. In particular, the crystals are notably cleaner because solvent esters form good recrystallizing agents for $H_{28}$ and $H_{32}$ acids, as compared with an acid menstruum. (For example, $H_{28}$ and $H_{32}$ acids cannot be cleanly recrystallized from acetic acid, although abietic acid ($H_{30}$) crystallizes beautifully from acetic acid.) The precipitated stabilized resin acids were filtered off, giving a yield of about 16 to 20 percent of the original tall oil, by weight. These solid materials may be recrystallized from a convenient organic solvent, such as an alcohol, ester, petroleum solvent, coal tar solvent, turpentine, or the like, to produce water white crystals of high stability toward oxidation, having a melting point of 160 to 170 degrees C., and having the positive sign of rotation, and being a mixture of $H_{28}$ and $H_{32}$ acids.

The reaction mixture of stabilized resin acids, before separation, has an acid number of about 90, as set out above; and the mother liquor, following crystallization, has an acid number of about 60, representing a removal in this example of about 16 percent of acid. The removal of acid is preferably controlled so that an acid number of 60 to 70 is a characteristic of the residual mother liquor, and the valuables of this mother liquor are then recycled through the system so that its content of resin acid and fatty esters can be recovered.

Thus, upon treatment with an alkali, followed by sedimentation, the lower layer consists of an aqueous solution of resinates with a small proportion of fatty esters; and upon acidification thereof, precipitation of resin acids occurs. The separated organic upper layer consists largely of fatty acid esters, together with unsaponifiables and a small amount of resin acid soaps; and may be recycled as stated above.

It is a characteristic of the procedure that the stabilized resin acids are less soluble in the ester liquor than the original resin acid, and hence a large proportion thereof can be obtained by simple crystallization and settling from the disproportionated mixture.

It is within the concept of the invention that the solvent present in the mother liquors from recrystallization of the resin acid may be recovered and re-used, together with the residues from the recrystallized resin acids, by adding to a further quantity of disproportionated tall oil containing selectively esterified tall oil matters having an acid number of about 60 to 70.

Example II

Tall oil was esterified and disproportionated as in Example 1, and the mixture was then poured into an equal part of water, by weight, and well mixed. Within about 1 minute, crystallization occurred, whereupon the mixture was allowed to cool and then was centrifugally filtered. A product of about 60 percent by weight (wet) was obtained of a crude resin acid material having a yellowish-brown color, with an acid number of about 165. The filtrate was then separated into two layers; the lower layer, being watery was drained off and discarded. The non-aqueous, organic upper layer is a fatty acid material containing about 40 percent by weight (wet) of fatty acid esters, unsaponifiables such as sterols, and free resin acids dissolved in the esters; and had an acid number of approximately 60. The fatty acid ester material contains very little water, and the resin acid material may contain 3 to 10 percent or even more of water, depending upon the efficiency of separation. It is, therefore, preferred to employ a high speed centrifuge wherewith the quantity of water may be kept at 3 percent or lower.

Example III

The filtrate of Example II, before separation into layers after removal of the bulk of crude resin acids, was heated to about 100 degrees C. A sodium hydroxide solution containing approximately 20 grams of sodium hydroxide in 20 grams of water was added to neutralize the free acids in the stabilized esterification mixture. After the mixture had become a black, jelly-like mass, about 700 grams of water was gradually added to dilute the soap solution, so that this assumed a concentration of about 1 to 3 percent. During the addition of the water, the temperature was maintained at about 100 degrees C. The mixture was then allowed to settle, and the lower aqueous layer was drawn off, separating it from an upper oily layer constituting approximately 30 to 35 percent, having an acid number of 1 to 20, and consisting essentially of esters of fatty acids and sterols and containing from ½ to 8 percent of resin acids. The lower aqueous layer can be acidified to recover stabilized resin acids therefrom; this resin acid fraction contains from 1 or 2 up to 16 percent of fatty acid esters, depending upon the factors of time, temperature and concentration.

Example IV

The stabilized esterification mixture of Example I, without separation of stabilized resin acid, was distilled at a pressure of 2 millimeters and at a temperature of about 200 to 260 degrees C., wherewith about 65 to 85 percent of the mixture came over as a distillate having an acid number of 1 to 30, and comprised essentially of esters of fatty acids, sterols, and unsaponifiables, with up to 10 percent of resin acids.

This distillation can also be accomplished of the non-aqueous materials obtained in Example II and III, whereby to separate esters of fatty acids while leaving the resin acid soaps essentially in the still. The resin acid soaps are dissolved from the still residue by water, leaving a neutral material (principally unsaponifiables) behind. The aqueous solution of resin acid soaps is then acidified and the resin acid obtained by filtering the precipitate therefrom.

Example V

When the selectively esterified tall oil of Example II was subjected to water-precipitation and centrifugal separation, the filtrate or efflux permitted to form layers, and the non-aqueous organic layer subjected to distillation at 2 millimeters pressure, a yield of 29 to 30 percent of fatty acid esters was obtained with boiling point below 200 degrees C. This product had a yellow color and an acid number of about 3. The still residue was a brownish mass containing stabilized resin acids and sterols. This still residue can be worked up by leaching with an aqueous alkaline solution, and acidifying the leach liquor for recovering the resin acid component thereof.

Example VI 100 parts by weight of tall oil was selectively esterified, as in Example I, and the product was then heated with 20 parts by weight of palladium powder or palladium supported on carbon or silica gel, as a catalyst, with thorough mixing at a temperature of 200 degrees C. for one hour. After standing for 1 to 24 hours, the precipitate was separated and was found to contain precipitated stabilized resin acids and the palladium catalyst. The yield of stabilized resin acids is about 16 to 25 percent, when the mother liquor is maintained at an acid number of 60 to 70 for recycling. The precipitate was separated by filtration, taken up in a solvent as described in Example I, and then the stabilized resin acids were recovered by recrystallization, leaving this second mother liquor with the catalyst therein. Instead of palladium, platinum or nickel can be employed, either with or without a catalyst carrier.

Either crude tall oil or refined tall oil can be employed under this example.

Example VII

Crude tall oil was selectively esterified as in Example I, and was then heated at ordinary pressure in the presence of fuller's earth, in the proportion of about 10 percent by weight of the earth for 6 hours at 190 to 200 degrees C. Upon standing, the product formed a precipitate containing the fuller's earth and also stabilized resin acids. This precipitate may be separated and purified as in Example VI above, with a similar yield.

Semi-refined or refined tall oil may be similarly selectively esterified and disproportionated.

Acid clays, acid silicates, or alumino-silicates, neutral or basic clays, etc., may be used in lieu of fuller's earth.

When the fatty acid ester fraction contains an objectionably high percent of resin acids, as may occur when the separation is being rushed for a maximum through-put with a given apparatus, it is feasible to accomplish further purification through fractional distillation of the mixture, as pointed out above, therewith also recovering a still residue which can be worked up for stabilized resin acid.

In the foregoing description, the expression "refined tall oil" has been employed as inclusive of the products obtained by vacuum distillation of crude distilled tall oil, with or without steam; the products from crude tall oil or tall oil fractions upon treatment with sulphuric acid with or without previous dissolution in gasoline; tall oil treated by heat at ordinary or high pressures; and tall oil treated with bleaching clays with or without the addition of solvents.

The stabilized resin acids separated according to the procedure are characterized by the fact that they are stable against oxidation when exposed to the atmosphere and upon sulfonation yield a mixture of sulfodehydroabietic acid and the lactone of hydroxytetrahydroabietic acid.

It is obvious that the invention is not limited to the forms of practice set out, but that it may be employed in many ways within the scope of the appended claims.

I claim:

1. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, and then separating the esterified and disproportionated mixture into a fraction rich in stabilized resin acids and a fraction rich in fatty acid esters.

2. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, then cooling and effecting crystallization of the said resin acids from a mother liquor containing the fatty acid esters, and separating the crystals from the mother liquor.

3. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, and yielding a product having an acid number of about 90, then cooling and effecting crystallization of the said resin acids from a mother liquor containing the fatty acid esters, separating the crystals from the mother liquor when the mother liquor has an acid value of about 60 to 70, and returning the mother liquor for mixture with further esterified and disproportionated tall oil.

4. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, then cooling and effecting crystallization of the said resin acids from a mother liquor containing the fatty acid esters, adding an aqueous alkali solution to the mother liquor and effecting saponification of resin acids therein, permitting sedimentation of the mixture and separating lower aqueous layer from an upper organic layer containing the fatty acid esters, and acidifying the material of said lower layer for precipitating a further quantity of resin acid therefrom.

5. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, then cooling and effecting crystallization of the said resin acids from a mother liquor containing the fatty acid esters, adding an aqueous alkali to the mother liquor and effecting saponification of resin acids therein, permitting sedimentation of the mixture and separating a lower aqueous layer from an upper organic layer containing the fatty acid esters, acidifying the material of said lower layer for precipitating a further amount of resin acid therefrom, and returning the said upper organic layer for mixture with further esterified and disproportionated tall oil.

6. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, mixing with water and separating the precipitate of stabilized resin acids from the mother liquor, permitting the mother liquor to settle and separating an organic upper layer containing fatty acid esters.

7. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, mixing with water and filtering the precipitate of stabilized resin acids from the mother liquor, saponifying the mother liquor with an aqueous alkali solution to neutralize free acids, diluting with water to a soap concentration of 1 to 3 percent, and permitting the mixture to settle and form an upper organic layer containing fatty acid esters and a lower aqueous layer and acidifying the lower layer for precipitating resin acids therefrom.

8. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, and distilling at a pressure of substantially 2 millimeters and a temperature of 200 to 260 degrees C. for removing a fatty acid ester fraction therefrom in amount of 65 to 85 percent of the mixture.

9. The process of separating resin acid and fatty acid fractions from tall oil containing abietic acid, which comprises esterifying the fatty acids with an alcohol in the presence of an acid esterifying catalyst, distilling to remove excess alcohol from the product and then adding a disproportionation catalyst and heating the mixture to a temperature of substantially 185 to 230 degrees C. and thereby disproportionating the resin acid molecules to form dehydroabietic and dihydroabietic acids, distilling at a pressure of substantially 2 millimeters and a temperature of 200 to 260 degrees C. for removing a fatty acid ester fraction therefrom, leaching the still residue with an aqueous alkali solution, and acidifying the alkali leach liquor to precipitate resin acids therefrom.

10. The process of separating rosin acid and fatty acid fractions from tall oil containing abietic acid which comprises heating the tall oil with methanol under reflux and in the presence of a mineral acid whereby to esterify the fatty acids thereof, distilling to remove excess methanol, mixing with a disproportionation catalyst, then heating the esterified material at a temperature of substantially 185 to 230 degrees C. for substantially one hour in the presence of substantially 0.6 percent of iodine and thereby disproportionating the resin acid molecules to form dehydroabietic and dihydroabietic acids, then cooling and effecting crystallization of said resin acids from a mother liquor containing the fatty acid esters and separating the crystals from the mother liquor.

11. The process of separating resin acid and fatty acid fractions from dried tall oil containing abietic acid, which comprises esterifying the fatty acids of the tall oil with an alcohol in the presence of about 2 percent by weight of sulfuric acid by heating with reflux; distilling and thereby removing excess alcohol; heating the residue to about 185 degrees C. and introducing about 0.6 percent iodine and holding at about 190 to 230 degrees C. for about one hour whereby to effect disproportionation of the resin acids; effecting crystallization of resin acids, and removing the crystallized resin acids from the mother liquor containing fatty acid esters.

12. The process of separating resin acid and fatty acid fractions from dried tall oil containing abietic acid, which comprises esterifying the fatty acids of tall oil with an alcohol in the presence of about 2 percent by weight of sulfuric acid by heating with reflux; distilling and thereby removing excess alcohol; heating the residue to about 185 degrees C. and introducing about 0.6 percent iodine and holding at about 190 to 230 degrees C. for about one hour whereby to effect disproportionation of the resin acids; effecting crystallization of resin acids, and removing the crystallized resin acids from the mother liquor containing fatty acid esters; adding aqueous alkali solution to the mother liquor whereby to neutralize free acids; diluting with water to a soap concentration of about 1 to 3 percent; allowing to settle and separating an upper organic layer containing fatty acid esters from a lower aqueous layer containing resin acid soaps.

13. The process of separating resin acid and fatty acid fractions from dried tall oil containing abietic acid, which comprises mixing the tall oil with about 15% by weight of methanol and about 2 percent by weight of sulfuric acid and heating with reflux whereby to provoke esterification of fatty acids; distilling and thereby removing excess methanol; heating the residue with about 0.6 percent iodine at about 185 to 230 degrees C. for about one hour; effecting crystallization of stabilized resin acids, and removing the crystallized resin acids from the mother liquor containing fatty acid esters.

TORSTEN HASSELSTROM.